July 23, 1968    H. O. WHITMAN    3,393,687

DENTAL FLOSS APPLICATOR

Filed Sept. 16, 1966

3,393,687
DENTAL FLOSS APPLICATOR
Homer O. Whitman, 119 Waters St.,
Boston, Mass. 02109
Continuation-in-part of application Ser. No. 487,239,
Sept. 14, 1965. This application Sept. 16, 1966, Ser.
No. 580,070
8 Claims. (Cl. 132—91)

ABSTRACT OF THE DISCLOSURE

A dental floss applicator comprising a rod of nonporous corrosion-resistant material having at its end a bifurcated floss-receiving aperture adapted to permit the convenient attachment and release of a length of dental floss, the free ends of the floss being held in one hand of the user and the applicator in the other hand thereby permitting the user to clean even the most inaccessible crevices between the teeth.

---

This is a continuation-in-part of my co-pending application Serial No. 487,239 filed September 14, 1965, now to be abandoned. This invention relates to a new applicator for dental floss or tape.

A substantial percentage of cases of bleeding gums, bad breath and tooth decay is caused by inadequate and ineffective oral hygiene. Although the advantages of the regular use of dental floss to clean between the teeth are well known, many do not avail themselves of its use simply because floss is hard to handle using the hands and fingers alone. According to the invention I provide a novel applicator for dental floss or tape which facilitates the use thereof in cleaning between the teeth.

My new applicator comprises a short flattened rod, preferably of light weight but strong and attractive plastic. The ends of the rod are pierced by a plurality of openings of such size and shape as to permit rapid and convenient attachment and release of a length of dental floss or tape. By inserting the end of the applicator rod to which a length of dental floss is attached into the mouth the user may bring the floss into an appropriate position for use upon the relatively inaccessible rear molars as well as the front teeth. The applicator is held in one hand, and the free end or ends of the floss are held in the other hand.

This arrangement is superior to earlier devices which hold a segment of dental floss in tension across a bow or between two prongs for several reasons. Firstly, the fact that the end or ends of the floss are free permits much more effective cleaning in that the free end or ends of the floss can be rotated vigorously while held in tension between the applicator and the hand thus dislodging even the most stubbornly lodged particles of food from between the teeth. Second, should the floss become trapped between closely embedded teeth, it may be readily extricated by releasing the free end or ends and tugging firmly upon the applicator. Third, although superior in cleaning efficacy to the two-pronged applicators previously used, the applicator of the present invention is much simpler and cheaper to manufacture. It may, for example, be constructed from a single readily molded rod of plastic with one or both ends thereof pierced by openings as described herein.

When the applicator is not in use, a length of floss may be conveniently stored upon the applicator and the applicator and floss may be hung upon a small wall-mounted hook or brad.

Other objects, features, and advantages of the invention will be apparent from the following detailed description of a preferred embodiment thereof representing the best mode presently contemplated for carrying out the invention. In the drawings.

Figure 1:
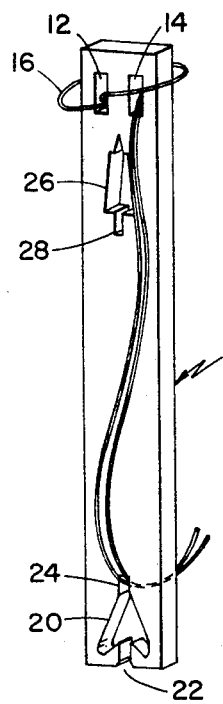
FIG. 1 is a view in perspective of the novel dental floss applicator showing a length of dental floss attached to the first (closed-slot) end of the applicator rod with the working ends of the floss anchored at the second (open-slot) end of the rod for convenient storage.

My new applicator is preferably molded from suitable plastic, strong and of attractive color, and comprises a flattened rod 10 of convenient length. Referring to FIGS. 1 through 4, at the first (closed-slot) end of the rod are two parallel side-by-side slotted openings 12 and 14. Referring to FIG. 1, below the two parallel side-by-side slotted openings 12 and 14 there is another opening 26 having at its lower extremity a floss-anchoring notch 28. At the second (open-slot) end of the rod 10 is a single heart-shaped or cardioid opening 20 with a narrow notch 24 extending upward from the apex of the cardioid opening 20 and a narrow slit 22 extending downward from the indention of the cardioid and communicating with the adjacent second end of the rod 10. Slit 22 widens out at the end of the rod to facilitate the insertion of dental floss into the cardioid opening 20.

Figure 2:
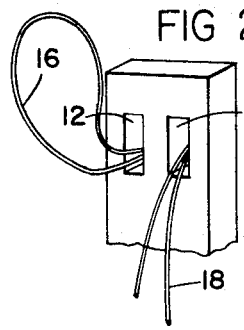
FIG. 2 is a fragmentary view similar to that of FIG. 1 showing only the closed-slotted openings at the first end of the rod to illustrate the manner of threading the applicator with dental floss.
Figure 3:
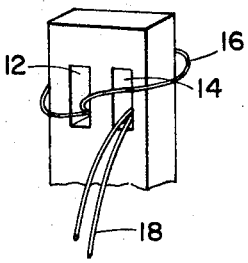
FIG. 3 is a similar view showing a length of floss completely inserted and anchored in place.

Referring to FIG. 2, the slots 12 and 14 are so dimensioned as conveniently to be threaded with a double length 18 of dental floss. The bight of the floss is introduced through slot 14 and led back through slot 12. The loop 16 is then placed around the end of the rod as seen in FIG. 3. For convenience of storage of the dental floss when not in use the free ends 18 may be passed through the slit 22 and caught in the anchoring notch 24 at the upper end of opening 20. The rod with floss attached may then be put away until further use. The opening 26 provides a convenient means for hanging the rod upon a small wall-mounted hook or brad.

Figure 4:
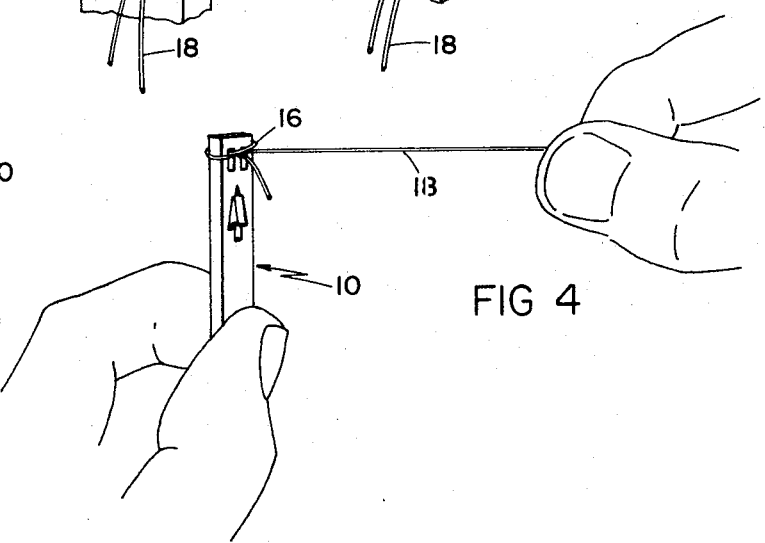
FIG. 4 shows the applicator and floss being held ready for use.

After being threaded onto the applicator the dental floss may be used double, or one of the free ends may be cut off near the applicator so that a single strand remains available for use as shown in FIG. 4. Of course, for single-strand use the length of dental floss may be doubled close to one end and so threaded as to reach the same result shown in FIG. 4 without cutting the floss. When using the floss, the free end or ends may be firmly held in the one hand while the other handholds the applicator. Should the floss become caught between closely spaced teeth, the free end or ends are simply rleased and the floss is extricated from the crevice between the teeth by tugging firmly upon the applicator rod. For removing worn floss from the applicator, the loop 16 is pushed up over the first end of the rod and the bight of floss is then readily removed from slots 12 and 14 by pulling the doubled strands 18. There is no need either to untie any knots or to cut the floss in order to remove it from the applicator.

An alternate method of using the applicator which some users find more convenient than the method described above is illustrated in FIGS. 5, 6 and 7. In this method of use, the floss may be attached to the second (open-slot) end of the rod by means of a "lark's head" knot. For convenience of storage of the dental floss when not in use the free ends 18 may be passed through the floss-storing opening 26 and caught in the floss-anchoring notch 28.

Figure 5:
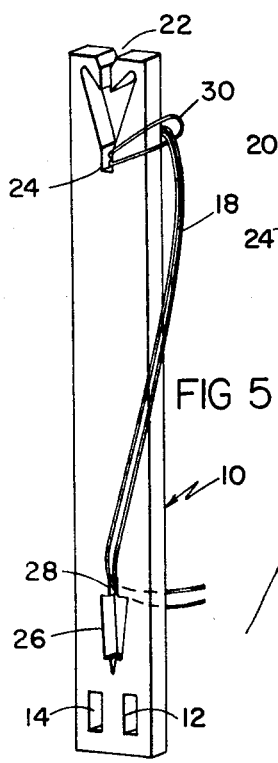
FIG. 5 is a view in perspective of the applicator showing a length of dental floss attached to the second (open-slot) end of the applicator rod with the loose ends of the floss anchored near the opposite end of the rod for convenient storage.
Figure 6:
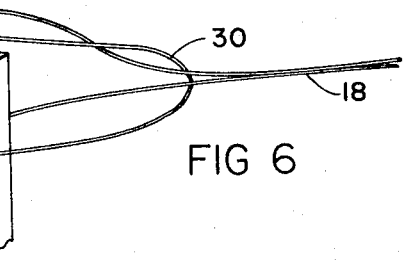
FIG. 6 is a fragmentary view similar to that of FIG. 5 showing only the open-slotted opening at the second end of the rod to illustrate an alternate manner of attaching the floss to the applicator.
Figure 7:
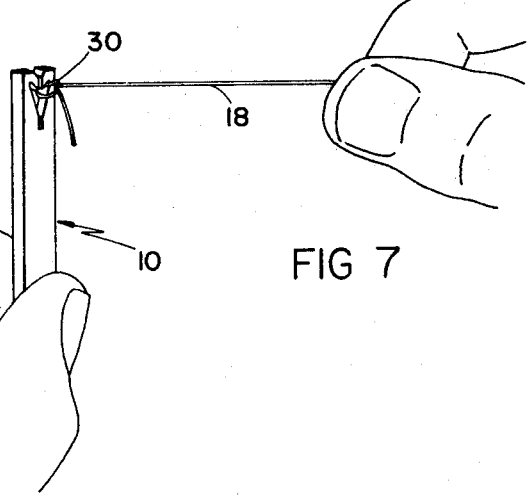
FIG. 7 is a view showing a length of dental floss completely inserted and anchored in place, and showing the applicator and floss being held ready for use.

The lark's head knot may be formed before attaching the floss as seen in FIG. 6, and then inserted through slit 22 into cardioid opening 20 to produce the result shown in FIG. 7. The same result may also be obtained by inserting a doubled bight of floss into notch 24 through slit 22 and cardioid opening 20, and by then threading the loose ends of the floss 18 back through loop 30 as seen in FIG. 5.

As in the first method of attachment, the floss may be used either single (as seen in FIG. 7) or double. To release the floss from the applicator rod, the loop 30 is pushed up to the top center of the rod. Then the floss may be readily released by pulling firmly on the loose ends 18. As in the first method of attachment there is no need either to untie the knot or to cut the floss in order to remove it from the applicator.

While there is herein described and illustrated a preferred embodiment of the invention it will nevertheless be understood that the same is susceptible of modification and changes by those skilled in the art. Accordingly, the invention is intended to be limited only by the proper scope to be afforded to the appended claims.

I claim:

1. A dental floss applicator comprising a rod at least one end of said rod having a floss-receiving aperture
   said aperture being sized to permit convenient attachment and release of the bight of a length of dental floss
   said aperture having first and second main side boundary surfaces generally directed toward the opposite outer side surfaces of said rod
   said aperture having at least one floss-retaining surface spaced from said first main side boundary surface in the direction of said second main side boundary surface
   said floss-retaining surface being generally directed toward said second main side boundary surface
   whereby the free ends of said length of dental floss may issue from the portion of said aperture between said floss-retaining surface and said first main side boundary surface and may be held in tension from the end of said rod, said floss-retaining surface preventing said free ends of said length of dental floss from coming in contact with said second main side boundary surface
   said rod being suitably sized for conveniently bringing an end thereof into colse proximity to the rearmost molars in the human mouth.

2. The dental floss applicator of claim 1 wherein said floss-receiving aperture comprises a generally cardioid (heart-shaped) opening extending entirely through said rod the indention of said cardioid opening being oriented toward said end of said rod and communicating with said end by a narrow slit extending from said indention of said cardioid opening to the end of said rod said slit being outwardly flared toward said end of said rod to facilitate the insertion of strands of dental floss through said slit into said cardioid opening and said slit being at its narrowest point of substantially the same width as the undeformed diameter of a single strand of dental floss.

3. The dental floss applicator of claim 1 wherein said floss-receiving aperture comprises a pair of slots adjacent to an end thereof said slots extending entirely through said rod and sized to permit convenient threading of a doubled bight of dental floss through a first one of said slots and back through a second one of said slots.

4. The dental floss applicator of claim 2 wherein said rod further defines a floss-storing opening remote from said end of said rod
   said floss-storing opening extending entirely through said rod and sized to permit convenient threading of at least two strands of dental floss said floss-storing opening being provided with a floss-anchoring notch in the periphery thereof said notch at its narrowest point being of a width no greater than the undeformed diameter of a single strand of dental floss whereby the free ends of a length of dental floss secured to said cardioid opening may be threaded through said floss-storing opening and pulled into said floss-anchoring notch for convenient storage of said dental floss when not in use.

5. The dental floss applicator of claim 3 wherein said rod further defines a floss-storing opening remote from said end of said rod.
   said floss-storing opening extending entirely through said rod and sized to permit convenient threading of at least two strands of dental floss said floss-storing opening being provided with a floss-anchoring notch in the periphery thereof said notch at its narrowest point being of a width no greater than the undeformed diameter of a single strand of dental floss whereby the free ends of a length of dental floss secured to said slots may be threaded through said floss-storing opening and pulled into said floss-anchoring notch for convenient storage of said dental floss when not in use.

6. The combination of a dental floss applicator as claimed in claim 1 and a length of dental floss attached to said floss-receiving aperture.

7. The combination of a dental floss applicator as claimed in claim 2 and a length of dental floss attached to said cardioid opening.

8. The combination of a dental floss applicator as claimed in claim 3 and a length of dental floss attached to said slots.

References Cited

UNITED STATES PATENTS

| 407,362 | 7/1889 | Mason | 132—91 |
| 2,059,287 | 11/1936 | Storm | 132—91 |
| 2,872,929 | 2/1959 | Rice | 132—91 |

FOREIGN PATENTS

| 580,091 | 7/1958 | Italy. |

LOUIS G. MANCENE, *Primary Examiner.*

J. W. MITCHELL, *Assistant Examiner.*